United States Patent
Imayoshi (10) Patent No.: US 8,908,219 B2
(45) Date of Patent: Dec. 9, 2014

(54) IMAGE FORMING APPARATUS INCLUDING AN AUTOMATIC PREVIEW DISPLAY PRINT CONDITION STORAGE PORTION FOR STORING PRESET PRINT CONDITIONS

(75) Inventor: Kenichiroh Imayoshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 798 days.

(21) Appl. No.: 12/641,438

(22) Filed: Dec. 18, 2009

(65) Prior Publication Data

US 2010/0182661 A1    Jul. 22, 2010

(30) Foreign Application Priority Data

Jan. 16, 2009  (JP) .................................. 2009-007714

(51) Int. Cl.
*G03F 3/10* (2006.01)
*H04N 1/00* (2006.01)

(52) U.S. Cl.
CPC ......... *H04N 1/0044* (2013.01); *H04N 1/00427* (2013.01); *H04N 1/00432* (2013.01); *H04N 1/00456* (2013.01); *H04N 1/00458* (2013.01); *H04N 1/00466* (2013.01); *H04N 1/00469* (2013.01); *H04N 1/00474* (2013.01); *H04N 1/00482* (2013.01); *H04N 2201/0094* (2013.01)
USPC .................... 358/1.16; 358/1.15; 358/1.18

(58) Field of Classification Search
CPC ............ H04N 12/006; H04N 1/00474; H04N 1/00432
USPC .......................................................... 358/527
See application file for complete search history.

(56) References Cited

U.S. PATENT DOCUMENTS

| | | | |
|---|---|---|---|
| 6,281,983 B1 | 8/2001 | Takahashi et al. | |
| 2006/0023240 A1 * | 2/2006 | Natori | 358/1.13 |
| 2007/0157084 A1 * | 7/2007 | Yano et al. | 715/527 |
| 2008/0204778 A1 | 8/2008 | Koarai | |
| 2008/0244439 A1 * | 10/2008 | Oguri et al. | 715/772 |
| 2008/0278758 A1 | 11/2008 | Sakuramata | |

FOREIGN PATENT DOCUMENTS

| | | |
|---|---|---|
| CN | 101257549 A | 3/2008 |
| CN | 101304465 A | 11/2008 |
| JP | 09-093378 | 4/1997 |
| JP | 2003-320740 | 11/2003 |
| JP | 2007-034444 | 2/2007 |
| JP | 2007-036809 | 2/2007 |

* cited by examiner

*Primary Examiner* — Benny Q Tieu
*Assistant Examiner* — Marcellus Augustin
(74) *Attorney, Agent, or Firm* — Renner, Otto, Boisselle & Sklar, LLP (57) ABSTRACT

An image forming apparatus is provided that automatically performs preview display of a document image data before printing if a print condition set by a user includes a preset print condition. When an instruction for print execution is given, a preview display control portion automatically performs preview display of document image data if a print condition set by a user includes a print condition for automatic preview display stored in an automatic preview display print condition storage portion.

1 Claim, 8 Drawing Sheets

IMAGE FORMING APPARATUS INCLUDING AN AUTOMATIC PREVIEW DISPLAY PRINT CONDITION STORAGE PORTION FOR STORING PRESET PRINT CONDITIONS

CROSS-NOTING PARAGRAPH

This non-provisional application claims priority under 35 U.S.C. §119(a) on Patent Application No. 2009-007714 filed in JAPAN on Jan. 16, 2009, the entire contents of which are hereby incorporated herein by reference.

FIELD OF THE INVENTION

The present invention relates generally to an image forming apparatus having a preview function, and more particularly, to an image forming apparatus that automatically provides preview display of a print image if a predetermined print condition is set.

BACKGROUND OF THE INVENTION

As higher functionality and higher performance are implemented in image forming apparatuses, a user is able to set print conditions such as a stapling and a punching in a complicated manner. To check whether a print condition set by a user is properly reflected, an image forming apparatus having a so-called preview function has been proposed that displays document image data (a print image) to which the print condition is applied on a display panel and the like, instead of printing on a paper sheet (Japanese Laid-Open Patent Publication No. 2007-36809).

When executing the preview function, a user must operate a preview execution button displayed on the display panel. However, since current image forming apparatuses have multiple operation screens for setting complicated print conditions, the operation of searching the operation screen for executing the preview function is troublesome.

Therefore, it is conceivable that default setting is configured to always execute the preview function when copying is performed, for example. However, it is also troublesome for a user that the preview function is automatically executed even when the preview function is obviously unnecessary.

It is thought that a case where it must be confirmed whether a set print condition is properly reflected on document image data is, for example, a case that requires a complicated setting such as a stapling and a punching which tend to cause erroneous copying or a case where considerable amounts of paper resources are wasted due to a failure of copying as in the case of making 10 or more copies.

SUMMARY OF THE INVENTION

It is an object of the present invention to provide an image forming apparatus that automatically performs preview display of a document image data before printing (copying) if a print condition set by a user includes a preset print condition.

Another object of the present invention is to provide an image forming apparatus comprising: a reading portion that reads a document carried from a bundle of document sheets placed on a document platform by an automatic document feeder to generate document image data; an automatic preview display print condition storage portion that stores preset print conditions for automatic preview display; and a preview display control portion that, when a print condition is set and an instruction for print execution is given, automatically performs preview display of document image data that is subjected to an image processing based on the set print condition, if the set print condition includes a print condition stored in the automatic preview display print condition storage portion.

Another object of the present invention is to provide the image forming apparatus, wherein before the preview display is automatically performed, a message screen is displayed for asking a user if the user wants that the preview display is executed.

PREFERRED EMBODIMENTS OF THE INVENTION

Figure 1:
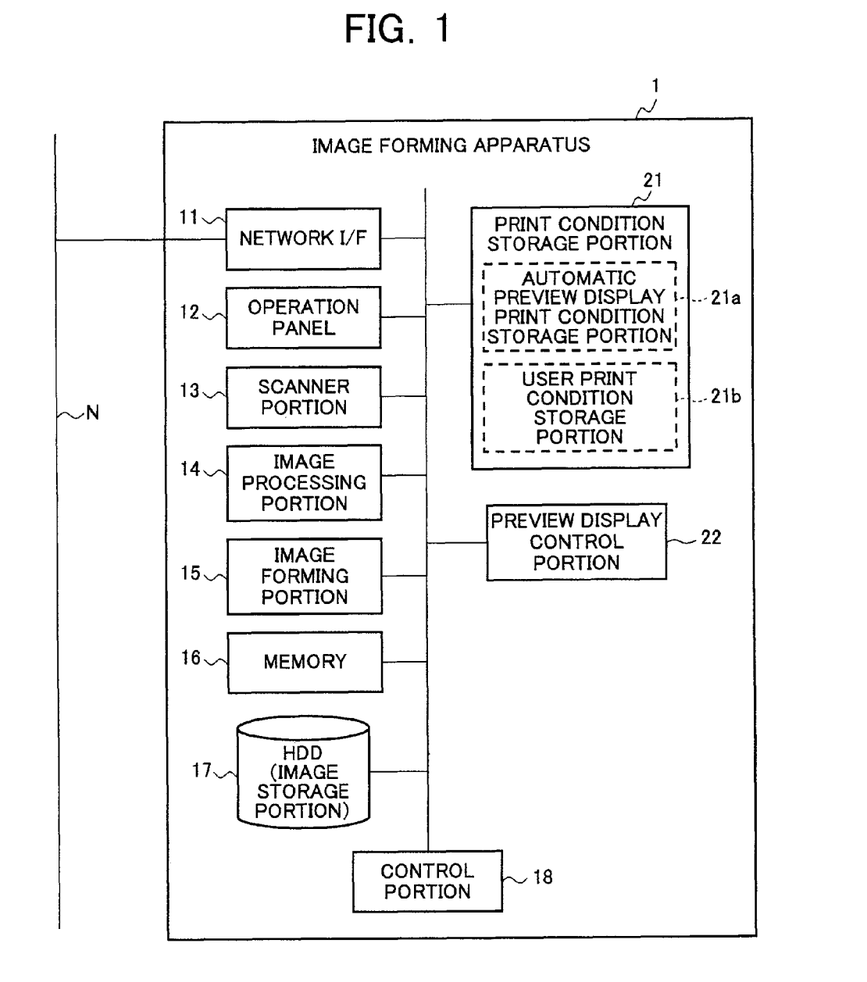
FIG. 1 is a functional block diagram of an image forming apparatus according to the present invention.

FIG. 1 is a functional block diagram of an image forming apparatus 1 according to the present invention.

Reference numeral 11 denotes a network I/F, which provides an interface function for a network N such as the internet and a local network to perform data transmission/reception to/from a facsimile apparatus (not depicted) and a PC (not depicted) connected to the network N.

Reference numeral 12 denotes an operation panel for operating the image forming apparatus 1, which is comprised of a display panel, a numeric keypad, etc.

Reference numeral 13 denotes a scanner portion including an auto document feeder (ADF) and the like, which scans a document to generate document image data. The scanner portion 13 includes a counter for counting the number of scanned documents.

Reference numeral 14 denotes an image processing portion that executes an image processing based on the print condition set by a user for the document image data generated by the scanner portion 13.

Reference numeral 15 denotes an image forming portion that performs image forming based on the print condition.

Reference numeral 16 denotes a memory that stores OSD data such as operation screens displayed on the display panel (see FIG. 2) and various pieces of control information, for example. Reference numeral 17 denotes an HDD (image storage portion) that records document image data generated by the scanner portion 13 and image data transmitted from a facsimile apparatus, PC, etc.

Reference numeral 18 denotes a control portion for controlling the functional blocks that executes the control for displaying the setting screen and the like.

Reference numeral 21 denotes a print condition storage portion including an automatic preview-display print condition storage portion 21a that stores preset print conditions for automatic preview display and a user print condition storage portion 21b that stores a print condition set by a user.

Reference numeral 22 denotes a preview display control portion that executes a preview-display image processing to the document image data stored in the HDD 17 and subjected to the image processing based on the print condition set by the user and displays the document processed image data on the display panel.

When an instruction for print execution is given, if the print condition set by the user includes a print condition for automatic preview display stored in the automatic preview-display print condition storage portion 21a, the preview display of the document image data is automatically performed.

(Setting of Print Conditions for Automatic Preview Display)

Details will be described for a setting processing of print conditions for automatic preview display according to the present invention.

Figure 2:
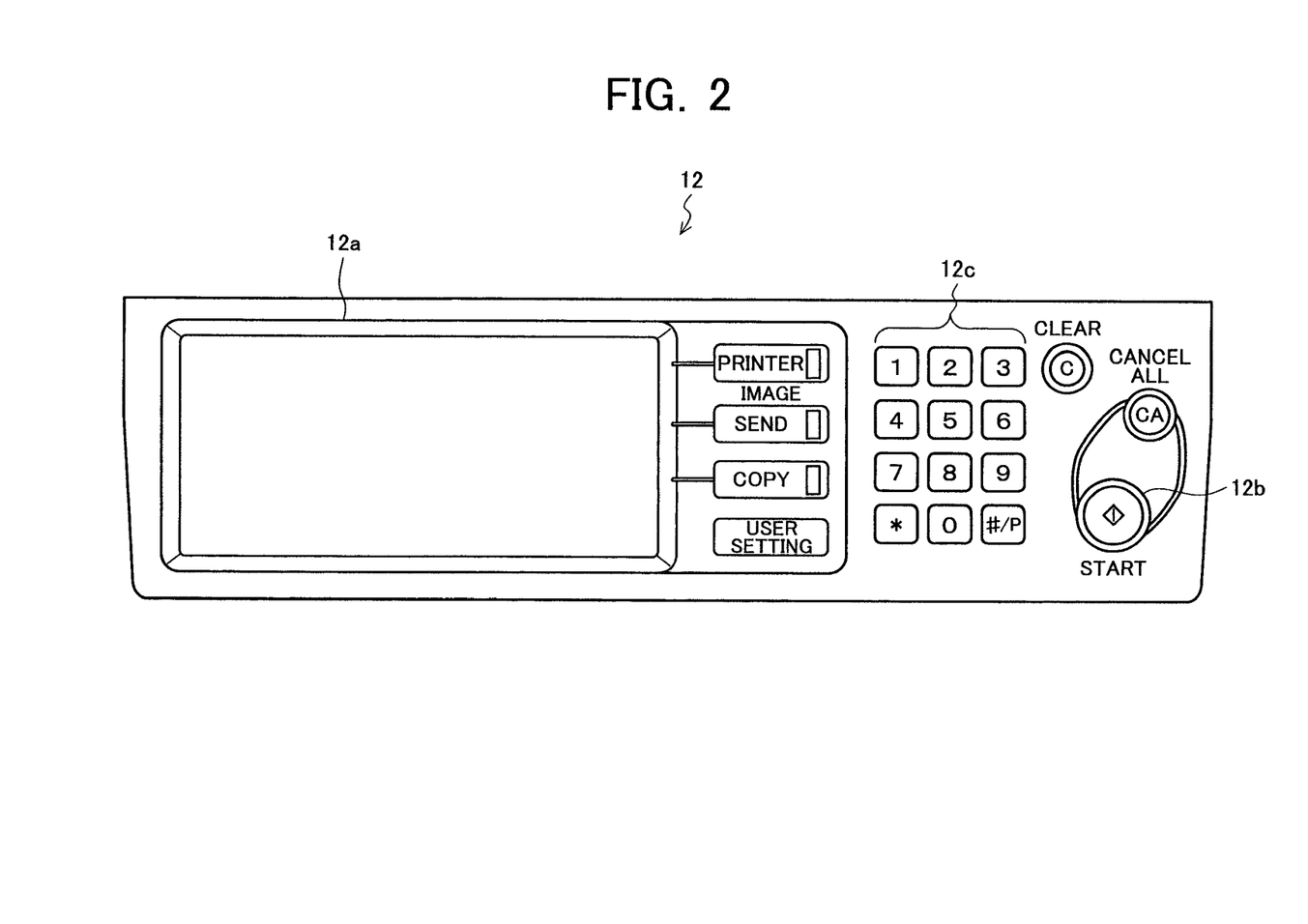
FIG. 2 is a diagram of an appearance of an operation panel.

FIG. 2 is a diagram of an appearance of the operation panel 12. Reference numeral 12a denotes a display panel that displays a setting screen, a preview screen, etc.; reference numeral 12b denotes a start key for starting scan/starting copy; and reference numeral 12c denotes a numeric keypad.

Figure 3:
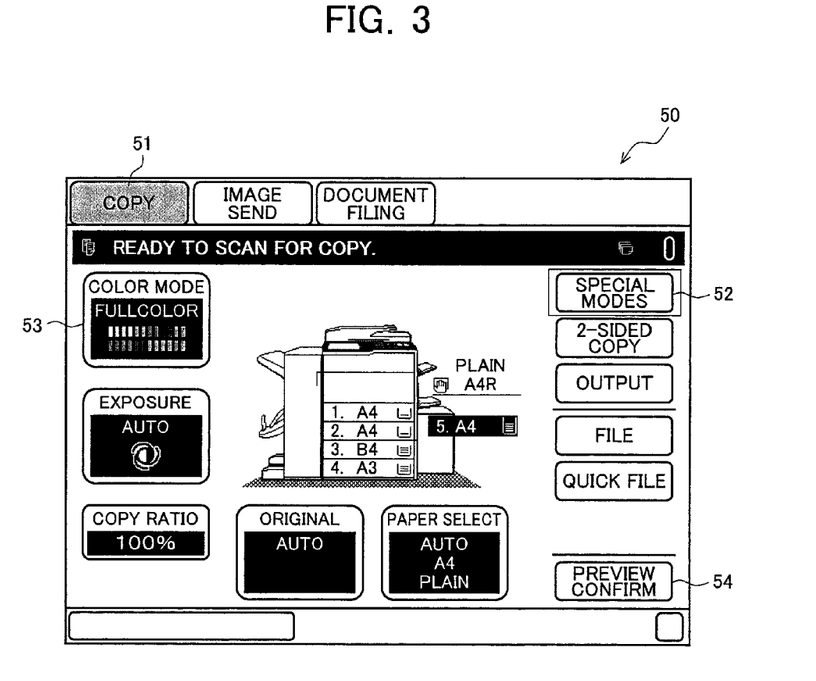
FIG. 3 is a diagram of a setting screen.

FIG. 3 depicts an example of a setting screen 50 displayed on the display panel 12a of the image forming apparatus 1. A copy 51 is selected by default. An administrator/a user of the image forming apparatus 1 may operate keys displayed on the setting screen 50 to set various print conditions and give instructions for executing various processes to the image forming apparatus 1.

For example, the administrator gives an instruction to display an automatic preview setting screen for setting the print conditions for automatic preview display control.

The automatic preview setting screen may be displayed if a certain character string, for example "*0123#" is input from the numeric keypad 12c of the operation panel 12 or, in another case, if an automatic preview setting key is operated on a special mode setting screen (not depicted) displayed after operating a special mode key 52.

Figure 4:
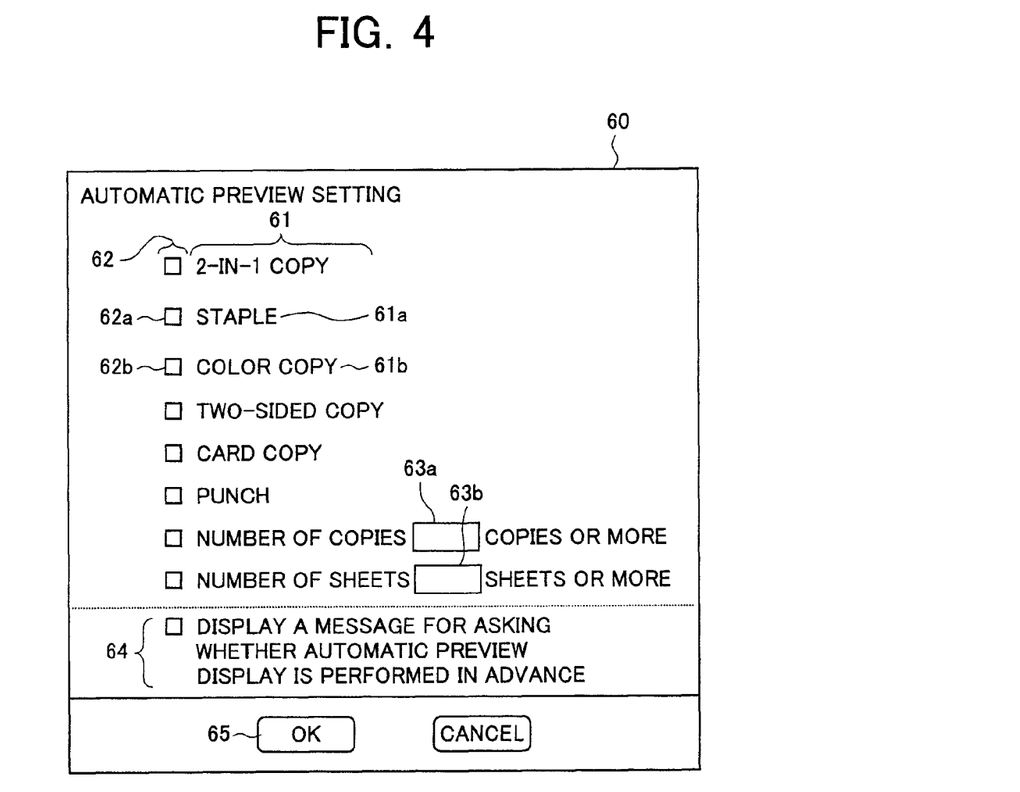
FIG. 4 is a diagram of an automatic preview setting screen.

FIG. 4 is a diagram of an automatic preview setting screen 60.

The automatic preview setting screen 60 is provided with print conditions for automatic preview display control as denoted by reference numeral 61 and check boxes 62 for setting the print conditions.

Examples of the print conditions include a case when a complicated setting is necessary such as N-Up printing, a stapling, two-sided printing, and a punching that tend to cause erroneous copying, and a printing processing for a predetermined numbers of copies (e.g., 10 copies or more)/a predetermined numbers of sheets (e.g., 50 sheets or more) causing considerable amounts of wasted paper resources due to a failure of copying.

When it is desired that the preview display is automatically performed if a user sets, for example, staple/color copy as a print condition, the administrator turns on a check box 62a of staple 61a/a check box 62b of color copy 61b.

When it is desired that the preview display is automatically performed if a user sets 10 copies or more as the number of copies or sets 50 sheets or more as the number of sheets per one copy as a print condition, the administrator inputs "10" and "50" into text boxes 63a and 63b, respectively, through the numeric keypad 12c and turns on corresponding check boxes.

After completion of the setting of the print conditions for automatic preview display control, if the administrator operates an OK key 65, the control portion 18 stores the print conditions that the administrator turned on the check boxes into the automatic preview-display print condition storage portion 21a.

In the case of the above example, the automatic preview-display print condition storage portion 21a stores "staple", "10 copies or more to be printed", and "50 sheets or more to be printed". A confirmation message denoted by reference numeral 64 will be described later.

(Automatic Preview Display)

Details of the automatic preview display according to the present invention will then be described. After the print conditions for automatic preview display is set as above, a user sets 10 sheets of documents to be copied on a document platform of the ADF and sets various print condition through the setting screen 50 displayed on the display panel.

It is assumed that the user operates a color mode key 53 of the setting screen 50 to set the color copying. The number of copies (the number of copies to be printed) is one. A plurality of print conditions may be set.

If the user operates the start key 12b on the operation panel 12 to give an instruction for executing the coping to the image forming apparatus 1, the print condition set by the user is stored in the user print condition storage portion 21b. In the case of the above example, "color copy" and "number of copies: 1 copy" are stored.

The scanner portion 13 scans the documents to be copied carried by the ADF to generate document image data. The image processing portion 14 executes the image processing based on the print condition stored in the user print condition storage portion 21b to the document image data and records the document image data into the HDD 17. When the scanning of all the documents is completed, the scanner portion 13 stores the number of all the scanned documents into the user print condition storage portion 21b. In the case of the above example, "number of copied sheets: 10 sheets" is stored.

When the document image data subjected to the image processing is recorded in the HDD 17, the preview display control portion 22 determines whether the print condition set by the user includes a print condition for automatic preview display stored in the automatic preview-display print condition storage portion 21a and automatically performs the preview display of the document image data if the condition is included.

In the case of the above example, since the automatic preview-display print condition storage portion 21a stores "color copy" as a print condition, the preview display is automatically performed.

Figure 5:
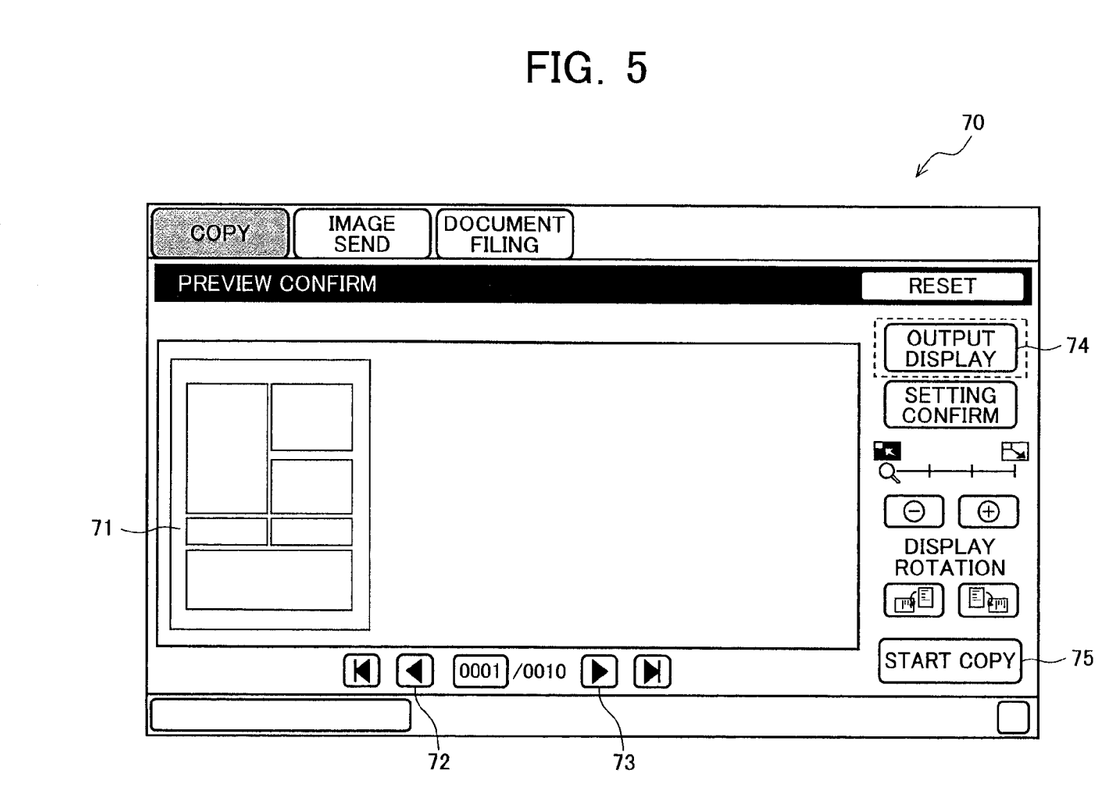
FIG. 5 is a diagram of a preview screen.

FIG. 5 depicts an example of a preview screen 70 and a preview image 71 of the document image data is displayed. If the user operates a next key 72/a previous key 73, the next/previous document image data of the displayed document image data is displayed.

If a user recognizes that the set print condition is properly reflected on the document image data by watching the preview display of the document image data and then operates a copy start key 75, the image forming portion 15 prints the document image data recorded in the HDD 17.

Figure 6:
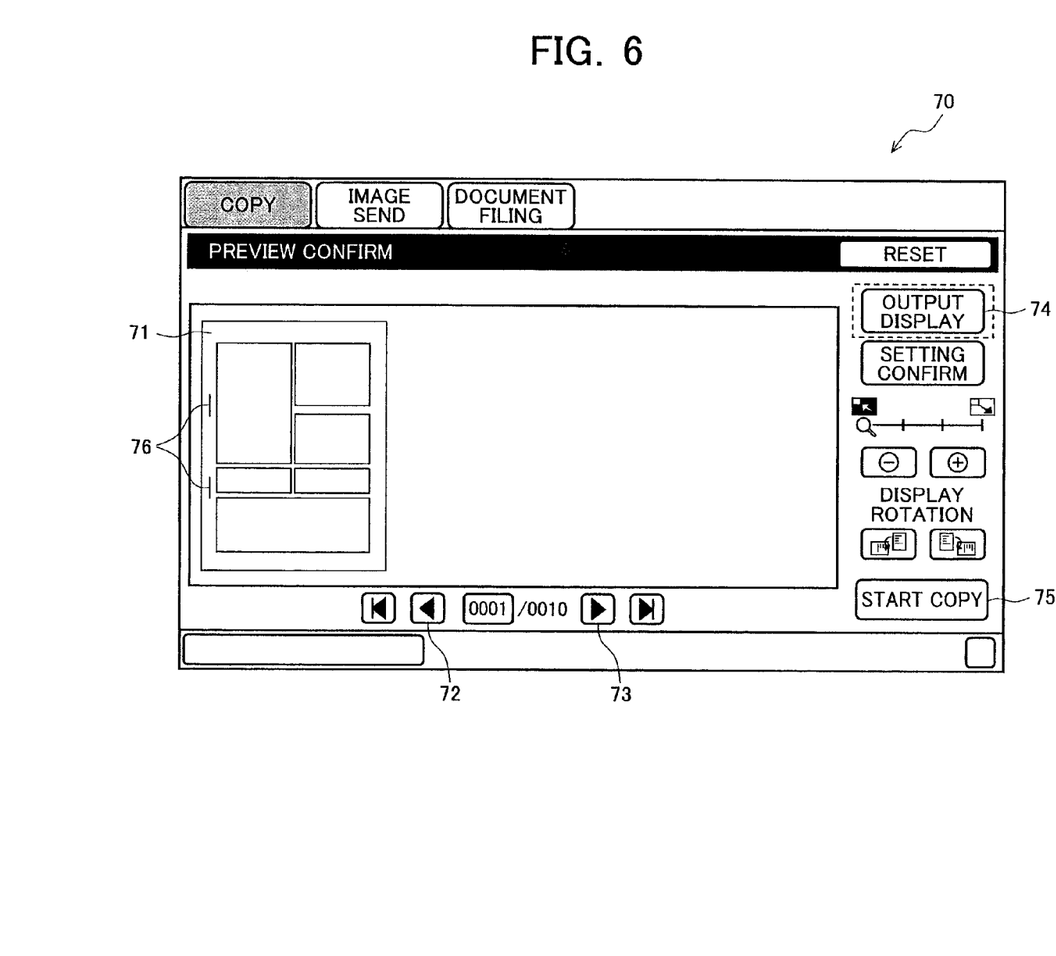
FIG. 6 is a diagram of another preview screen.

If the user set staples as the print condition and then operates an output display key 74 the set staples are displayed as denoted by reference numeral 76 of FIG. 6.

If it is determined that the print condition set by the user includes no print condition stored in the automatic preview-display print condition storage portion 21a, the preview display is not performed for example, for making one monochrome copy from two or three sheets of documents unless a preview confirm key 54 on the setting screen 50 is operated.

Figure 7:
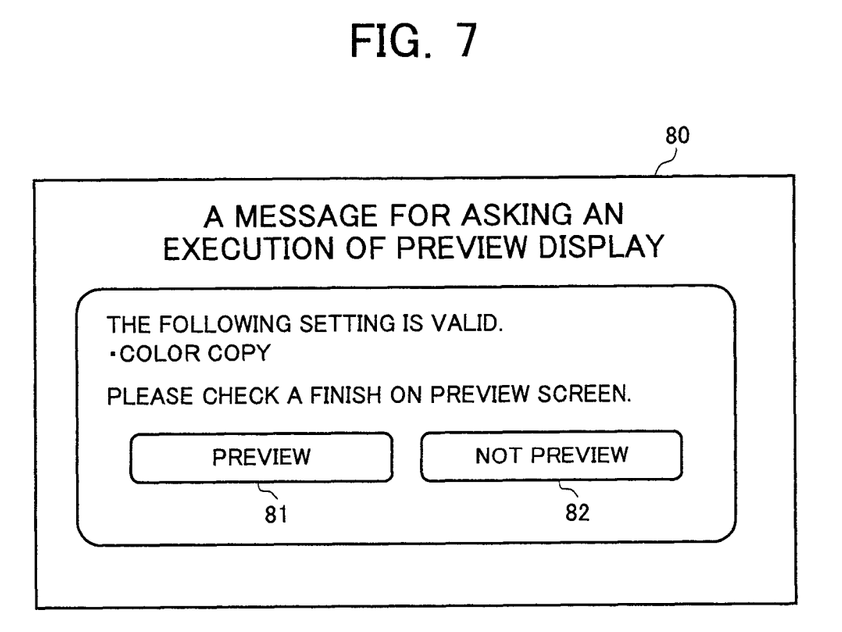
FIG. 7 is a diagram of a message screen.

Before performing the preview display, a message screen 80 as depicted in FIG. 7 may be displayed for asking a user if the user wants that the preview display is executed.

The message screen 80 displays the print condition set by the user included in the print conditions for automatic preview display, i.e., that the color copy is set in the above example. If the user sets the staple in addition to the color copy, "• COLOR COPY" and "• STAPLE" are displayed. In another case, the message screen 80 may display all the print conditions set by the user or the print conditions for automatic preview display set by the administrator.

If the user operates a preview key 81, the preview display is executed and if the user operates a not-preview key 82, the preview display is not executed.

As a result, if copying is performed by an experienced user who makes no mistakes in the copying even when a complicated print condition is set, the preview display may not be performed and, therefore, user's convenience is improved.

In a case where it is set whether the massage screen 80 is displayed, an asking message check box on the automatic preview setting screen 60 depicted in FIG. 4 may be turned on (see reference numeral 64 of FIG. 4).

Figure 8:
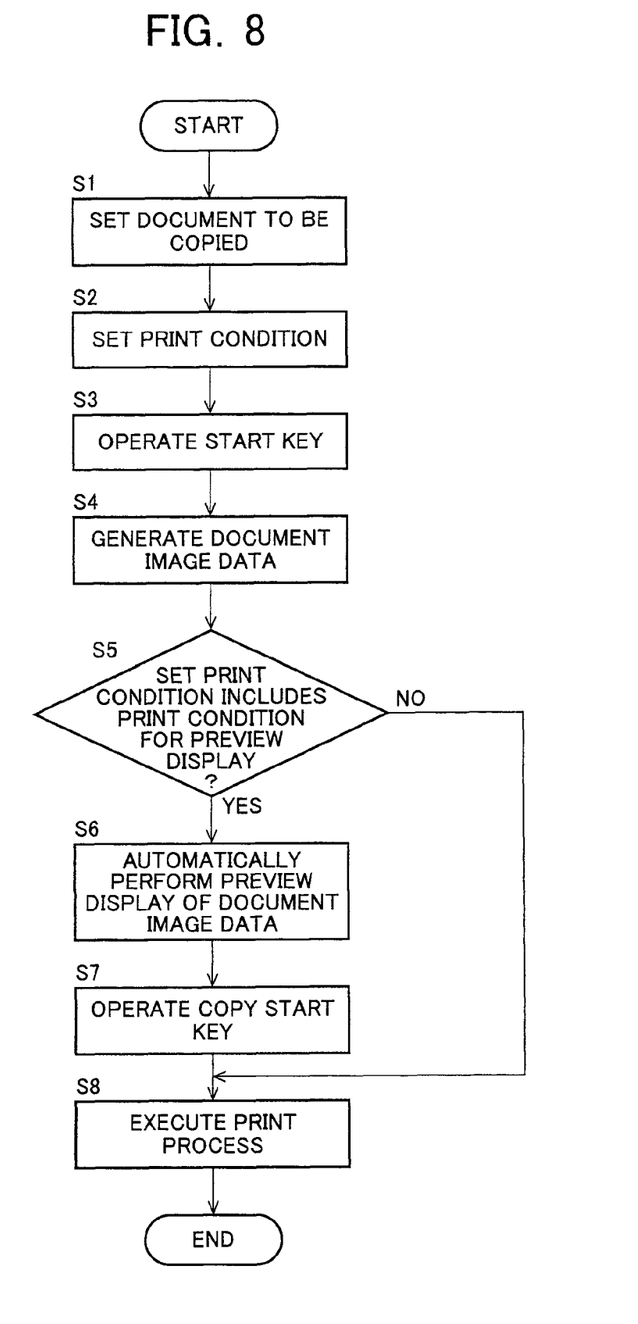
FIG. 8 is a flow diagram for explaining automatic preview display.

The preview display processing will be described with reference to a flow diagram of FIG. 8. It is assumed that the print conditions for automatic preview display are already set by an administrator.

A user sets a document to be copied in the image forming apparatus 1 (step S1) and sets a print condition (step S2).

When the start key 12*b* on the operation panel 12 is operated (step S3), the document is read by the scanner portion 13 to generate document image data corresponding to the document (step S4). The generated document image data is subjected to the image processing based on the print condition stored in the user print condition storage portion 21*b* and is recorded in the HDD 17.

If it is determined that the print condition set by the user includes a print condition for automatic preview display stored in the automatic preview-display print condition storage portion 21*a* (step S5/YES), the preview display control portion 22 automatically performs the preview display of the document image data (step S6).

When the copy start key 75 of the preview screen 70 is operated (step S7), the document image data is printed by the image forming portion 15 based on the print condition set by the user (step S8).

If it is determined that the print condition set by the user includes no print condition for automatic preview display stored in the automatic preview-display print condition storage portion 21*a* (step S5/NO), the processing for the preview display (steps S6 and S7) is skipped and the process of step S8 is executed.

If the asking message check box on the automatic preview setting screen 60 has been turned on, the message screen 80 depicted in FIG. 7 is displayed after step S5. If the user operates the preview key 81, the processes following the step S6 are executed and if the user operates the not-preview key 82, the process of the preview display (steps S6 and S7) are skipped and the process of step S8 is executed.

The present invention improves user's convenience since the preview display is automatically performed before printing if a user sets a print condition tending to cause erroneous printing or a print condition causing a considerable amount of wasted paper resource due to a failure of printing.

The invention claimed is:

1. An image forming apparatus comprising:
a reading portion that reads a document carried from a bundle of document sheets placed on a document platform by an automatic document feeder to generate document image data;
an automatic preview display print condition storage portion that stores preset print conditions for a predetermined number of copies or for a predetermined number of sheets in order to determine whether to perform an automatic preview display; and
a preview display control portion that, when a print condition is set and an instruction for print execution is given, compares the set print condition and the stored preset print conditions, automatically performs preview display of document image data that is subjected to image processing based on the set print condition without receiving an instruction for performing the preview display from a user if the set print condition includes a print condition stored in the automatic preview display print condition storage portion, and does not perform preview display of the document image data automatically if the set print condition does not include a print condition stored in the automatic preview display print condition storage portion unless an instruction for preview display is given separately.

\* \* \* \* \*